United States Patent [19]

D'Andrade

[11] Patent Number: 4,764,141

[45] Date of Patent: Aug. 16, 1988

[54] TOY BUBBLE BLOWING MACHINE

[76] Inventor: Bruce M. D'Andrade, 3 Ten Eyck Road, Whitehouse Sta., N.J. 08889

[21] Appl. No.: 138,921

[22] Filed: Dec. 28, 1987

[51] Int. Cl.[4] .............................................. A63H 33/28
[52] U.S. Cl. ......................................... 446/16; 446/20
[58] Field of Search ..................................... 446/15-20

[56] References Cited

U.S. PATENT DOCUMENTS

| 2,794,292 | 6/1957 | Noble | 446/16 |
| 4,576,582 | 3/1986 | Panzarella | 446/16 |
| 4,700,965 | 11/1987 | Kingberg | 446/16 |

FOREIGN PATENT DOCUMENTS 2186199  8/1987  United Kingdom ................. 446/15

Primary Examiner—Robert A. Hafer
Assistant Examiner—Michael Brown
Attorney, Agent, or Firm—Kenneth P. Glynn

[57] ABSTRACT

The present invention involves a toy bubble blowing machine which has a housing which forms at least a part of a toy. The housing may simulate a motor and may be mounted on a ridable toy such as a bicycle, tricycle, toy auto, or the like. The toy bubble blowing machine includes a drive axle and a motive power source connected to, and capable of, driving the drive axle. The motive power source may be a battery operated motor and batteries or may be direct drive through gears, pulleys, or otherwise from the axle of wheels on a ridable toy. The bubble blowing machine also includes a bubble wand which has a plurality of wand heads with bubble forming orifices and a central hub. The wand heads are arranged symmetrically and concentrically above the hub and a hub axle extends from the hub. A Geneva mechanism is used which has a first gear which is continuously rotatable and a second gear which is a step gear and is rotatable through an arc intermittently. The first gear and the second gear are interconnected and the first gear is driven either directly or indirectly by the drive axle and the second gear is located on the hub axle itself so as to permit the motive power source to drive the bubble wand intermittently and so as to sequentially rotate each of the wand heads through a bubble liquid source position and through a bubble blowing position. There is a bubble liquid source located below the hub to permit rotation of the wand heads through it and there is also an impeller which is capable of blowing adequate air movement through one of the wand heads to create bubbles. The impeller is driveably connected to, and driven by, the motive power source. Finally, the present invention device includes a shutter which has a first position to block air movement created by the impeller from impinging on any wand heads while the wand is in motion and a second position to permit air movement to impinge upon the wand head to make bubbles while the wand head is not in motion. This is achieved by an abrupt drop off cam lift arrangement which operates the shutter.

26 Claims, 3 Drawing Sheets

TOY BUBBLE BLOWING MACHINE

BACKGROUND OF THE INVENTION

1. Field of the Invention

This invention relates generally to toy bubble blowing machines and more particularly to toy bubble blowing machines designed for continual production of a series of bubbles while in operation. The invention also relates specifically to a toy bubble blowing machine which is a simulated motor and which may be mounted on a riding toy or the like.

2. Prior Art Statement

There are numerous patents which have issued over the years to various types of user-operated and automatically operated bubble blowing machines. Some of these involve single wand-type generators and others involve rotating wands having a plurality of openings for the generation of bubbles.

Examples of devices which have been developed for the operator to run in order to generate bubbles are found in U.S. Pat. Nos. 4,044,946; 3,626,631; and 2,625,768. In U.S. Pat. No. 4,044,496 to Hans Jernstrom, a hand cranking device is utilized to rotate a wand wheel having a series of wands through a bubble liquid source and, through gears off the same drive shaft, to simultaneously rotate a fan to generate the air which flows through the wands to create the bubbles. A housing is utilized which includes an orifice through which the bubbles are emitted. U.S. Pat. No. 3,626,631 to Victor Lerman describes a soap bubble generator which is adapted to generate continuous controllable soap bubbles in response to a stream of air in which the device is placed such as when mounted on a bicycle. The device is provided with a hollow ring with an annular construction through which soap passes to form soap bubbles. Control of bubble formation is provided by a sealing pad which is movable by the operator from a closed position abutting the rearward face of the ring to a remote position thus permitting the flow of air and soapy fluid to be controlled. U.S. Pat. No. 2,625,768 to Finn Magnus describes a device which simultaneously creates bubbles and a sound. The user blows air or otherwise provides air through a tube which lifts up a hinged member which allows air to pass therethrough and which simultaneously lifts a single wand out of a reservoir to create bubbles.

In addition to devices which require an active involvement of the user, many bubble blowing devices have been developed which operate either through batteries or through other motive power. For example, U.S. Pat. No. 4,576,582 illustrates a toy lawn mower which includes a pulley-driven shaft which, through a series of gears, simultaneously operates an impeller to create an air flow through a wand wheel having a series of wands which sequentially and continously pass through a bubble liquid reservoir. Likewise, U.S. Pat. No. 4,556,392 which issued to Nelson Chang describes a self-driven bubbling toy in the form of a bubbling octopus which includes a blowing means to produce an air jet and a delivering means to deliver an amount of bubbling liquid from a reservoir to the route through which the air passes. In this case, air continuously passes through a tube while a cam-driven mechanism brings a wand from a bubble liquid source up to the jet of air to repeatedly create bubbles. The bubbles apparently are emitted through the nose of the toy octopus. Other patents such as U.S. Pat. Nos. 4,447,982; 4,299,049; 4,045,049; 3,228,136; and, 3,100,947 all describe various types of bubble generating machines which have either a series of rotating orifices or a single wand-type mechanism which is operated directly or indirectly through a power source which simultaneously operates a fan or impeller blade to create the air flow which is necessary to generate the bubbles.

Notwithstanding the prior art cited above, it appears that there has been no teaching which will enable the optimal generation of bubbles with a bubble machine by providing intermittent rather than continuous air flow and also providing intermittent rather than continuous movement of the wands carrying the liquid. Thus, the present invention specifically requires intermittent air flow by the use of a shutter which is cam operated while also requiring that a wand wheel or a bubble wand having a plurality of heads rotate periodically or continually so that a given wand head is specifically located in front of the air source before the air source is opened. This enables more efficient and complete use of the liquid and prevents premature bubble formation so as to optimize the likelihood of bubble formation as well as the size of the bubble and maximum utilization of the liquid.

SUMMARY OF THE INVENTION

The present invention involves a toy bubble blowing machine. which has a housing which forms at least a part of a toy. The housing may simulate a motor and may be mounted on a ridable toy such as a bicycle, tricycle, toy auto, or the like. The toy bubble blowing machine includes a drive axle and a motive power source connected to, and capable of, driving the drive axle. The motive power source may be a battery operated motor and batteries or may be direct drive through gears, pulleys, or otherwise from the axle of wheels on a ridable toy. The bubble blowing machine also includes a bubble wand which has a plurality of wand heads with bubble forming orifices and a central hub. The wand heads are arranged symmetrically and concentrically above the hub and a hub axle extends from the hub. A Geneva mechanism is used which has a first gear which is continuously rotatable and a second gear which is a step gear and is rotatable through an arc intermittently. The first gear and the second gear are interconnected and the first gear is driven either directly or indirectly by the drive axle and the second gear is located on the hub axle itself so as to permit the motive power source to drive the bubble wand intermittently and so as to sequentially rotate each of the wand heads through a bubble liquid source position and through a bubble blowing position. There is a bubble liquid source located below the hub to permit rotation of the wand heads through it and there is also an impeller which is capable of blowing adequate air movement through one of the wand heads to create bubbles. The impeller is driveably connected to, and driven by, the motive power source. Finally, the present invention device includes a shutter which has a first position to block air movement created by the impeller from impinging on any wand heads while the wand is in motion and a second position to permit air movement to impinge upon the wand head to make bubbles while the wand head is not in motion. This is achieved by an abrupt drop off cam lift arrangement which operates the shutter.

BRIEF DESCRIPTION OF THE DRAWINGS

The present invention is more fully understood when taken in conjunction with the description of the invention set forth in detail below, and also taken in conjunction with the accompanying drawings, wherein.

DETAILED DESCRIPTION OF THE PRESENT INVENTION

Figure 1:
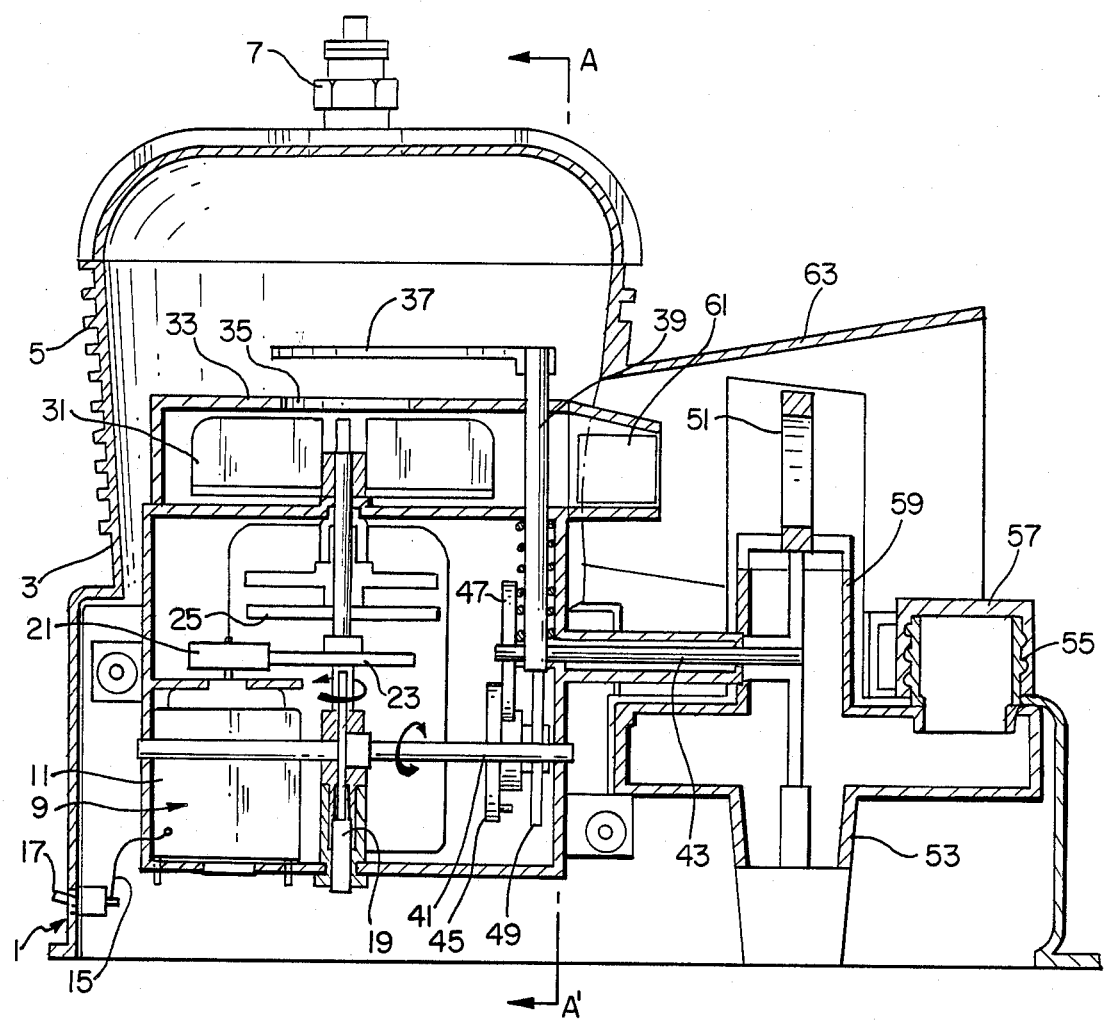
FIG. 1 shows a cut side view of a preferred bubble blowing machine of the present invention.

As mentioned in the Summary, the present invention involves a toy bubble blowing machine which includes a housing, a drive axle and a motive power source connected to, and capable of, driving the drive axle. In one embodiment, the drive axle is driven by a battery operated motor and in another embodiment, the drive axle is driven by direct drive off of a wheel axle of a toy which is ridden by the operator, such as a tricycle. Other motive power sources may be used, such as wind-up or spring, weight and pulley, or any other known motive power source without exceeding the scope of the present invention.

The toy bubble blowing machine also includes a bubble wand having a plurality of wand heads with bubble forming orifices and having a central hub. The wand heads are arranged symmetrically and concentrically about the hub and a hub axle extends from the hub of the bubble wand. A Geneva mechanism which has a first gear which is continuously rotatable and has a second gear which is a step gear which is rotatable through an arc intermittently. The first gear and second gear are interconnected and the first gear is driven either directly or indirectly by the drive axle and the second gear is located on the hub axle so as to intermittently drive the bubble wand. More specifically, the Geneva gear arrangement allows for sequential rotation of each of the wand heads through a bubble liquid source position and ultimately through a bubble blowing position and then, back again through the same sequence. The bubble blowing machine of the present invention also includes a liquid source which is located below the hub to permit rotation of the wand heads through it.

The bubble blowing machine of the present invention also includes an impeller or fan which is capable of blowing sufficient air through a wand head to create bubbles, the impeller or fan being driven by the motive power source. Finally, the present invention bubble blowing machine includes a shutter device which has a first position to block air movement created by the impeller or fan from impinging on any wand head while the wand head is in motion and a second position wherein the air movement is permitted to proceed so as to impinge upon the wand head to make one or more bubbles while the wand is not in motion. Thus, the shutter is essentially closed while the wand is in motion and is open while the wand is stationary.

In a preferred embodiment, the toy bubble blowing machine of the present invention includes a bubble expulsion shaft through which bubbles move after being formed and this shaft is particularly advantageous if it is elongated and circular and has an increasing diameter so as to encourage larger volume bubbles to be created during their formation.

In another embodiment, the present invention allows for variable speed of bubble blowing machine itself, either via control of the speed of a riding toy or via control of from the motive power source, e.g. by use of as variostart or a friction device.

Also, the present invention includes embodiments wherein noisemaking capabilities are integrated within the bubble blowing machine so as to create a repeating or rat-a-tat-type noise to stimulate the operation of a motor such as a motorcycle or a dune buggy motor, or the like.

In order to facilitate the understanding of the present invention in reviewing the drawings accompanying the specification, a components list is provided below. It should be noted that like parts are like numbered throughout all of the Figures.

TABLE 1

| Number | COMPONENTS LIST Component |
|---|---|
| 1 | Bubble Blowing Machine |
| 3 | Housing |
| 5 | Simulated Motor Design, e.g. Motorcycle (optional) |
| 7 | False Spark Plugs (Optional) |
| 9 | Motive Power Source |
| 11 | Battery Operated Motor |
| 13 | Batteries |
| 15 | Wiring From Batteries To Motor |
| 17 | Motive Power Source On/Off Switch |
| 19 | Drive Axle |
| 21 | Gear At Motor 11 |
| 23 | Main Gear From Gear 21 To Drive Axle 19 |
| 25 | Drive Axle Brace |
| 27 | Noisemaker Wheel |
| 28 | Washer Pin |
| 29 | Noisemaker Floating Washer |
| 30 | Noisemaker Diaphragm |
| 31 | Impeller |
| 33 | Impeller Enclosure |
| 35 | Impeller Enclosure Orifice |
| 37 | Shutter |
| 39 | Shutter Lift Rod |
| 41 | Connecting Axle |
| 43 | Hub Axle |
| 45 | First Geneva Gear |
| 47 | Second Geneva Gear |
| 49 | Shutter Cam |
| 51 | Bubble Wand |
| 53 | Bubble Liquid Source Tray |
| 55 | Liquid Fill Cap Neck |
| 57 | Liquid Fill Cap |
| 59 | Extended Sides of Tray 53 |
| 61 | Air Intake |
| 63 | Bubble Expulsion Shaft (Elongated, Circular Of Increasing Diameter) |
| 71 | First Geneva Gear Base Plate |
| 73 | First Geneva Gear Cut Cylinder |
| 75 | First Geneva Gear Peg |
| 77 | Second Geneva Gear Configuration |
| 79 | Shutter Lift Rod Catch |
| 81 | Shutter Spring |
| 91 | Big Wheeler Toy Tricycle |
| 93 | Peddle Operated Front Wheel |
| 95 | Operator's Seat |
| 97 | Pulley Wheel |
| 99 | Belt From Bubble Machine Pulley Wheel To Rear Wheel Of Tricycle |

Referring now to FIG. 1, there is shown bubble blowing machine 1 which includes housing 3 which has simulated motor design tooling grid work 5 and false spark plugs 7. Motive power source 9 is shown which, in this embodiment, includes battery operated motor 11, batteries 13 and wiring 15 running from the batteries to the motor and passing through on/off switch 17.

Also shown in FIG. 1 is drive axle 19 which is driven by motor 11 through gear 21 and main gear 23 which is located on drive axle 19. Drive axle brace 25 is shown which acts to stabilize drive axle 19 but which is not an essential feature. Noisemaker wheel 27 is located on drive axle 19 and, when motor 11 is switched on at switch 17, gear 21 drives main gear 23 and drive axle 19 which, in turn, drives noisemaker wheel 27. Noisemaker wheel 27 contains washer pin 28 and floating washer 29. Each time noisemaker wheel 27 makes a rotation floating washer 29 strikes noisemaker diaphragm 30 and this is repeated in a rapid fashion during operation. Also, drive axle 19 drives impeller 31 which is contained within impeller enclosure 33 and pulls air in through air intake 61 and forces that air out through impeller enclosure orifice 35, which air then passes to the right of impeller enclosure 33 and through a wand head of bubble wand 51 to create one or more bubbles. The bubbles travel down bubble expulsion shaft 63 which, in this case, is circular and of increasing diameter down the shaft.

Figure 4:
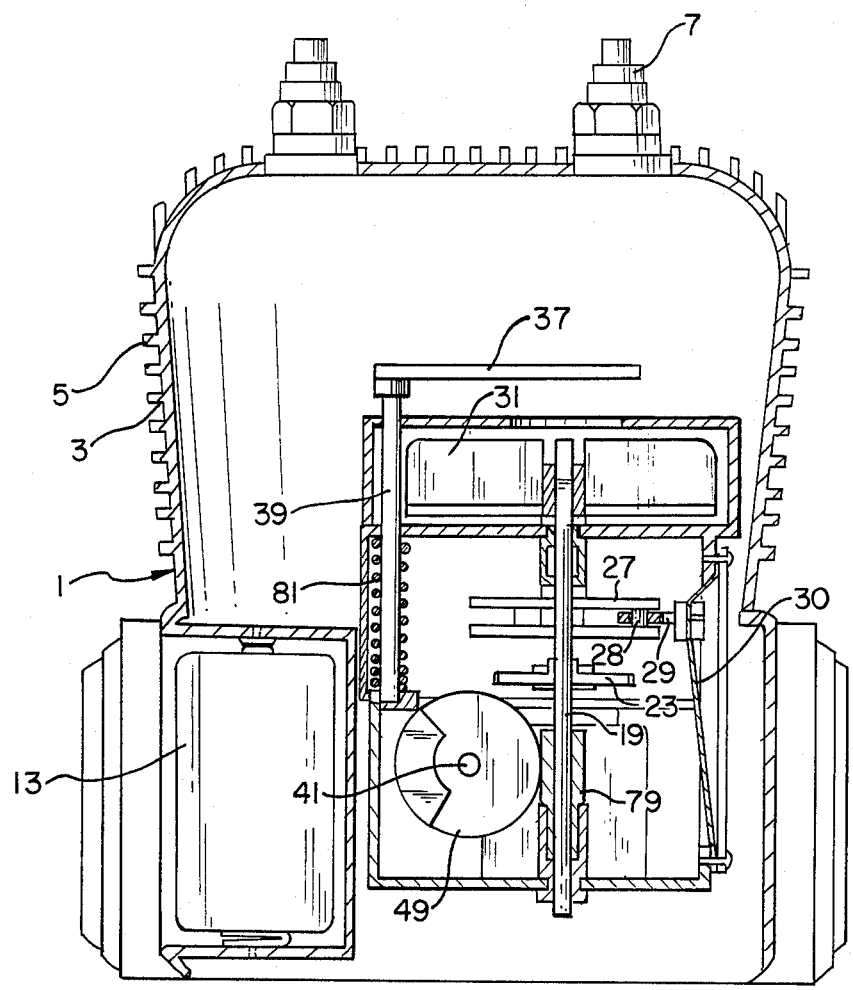
FIG. 4 illustrates a cut rear view of the device shown in FIG. 1 taken along the cut line AA' of FIG. 1.

Shutter 37 is arranged so as to move up and down via shutter lift rod 39 which is motivated by connecting axle 41 which drives off of drive axle 19, as shown. When motor 11 is turned on, drive axle 19 rotates connecting axle 41 which contains shutter cam 49. As shutter cam 49 rotates, it lowers shutter 37 so as to close orifice 35 for a time period and then continues to rotate so as to lift shutter 37 to open orifice 35 and holds orifice 35 and shutter 37 in the open position for a period of time and then continues to rotate to again close shutter 37 and close orifice 35 and repeats this cycle as connecting axle 41 rotates. Referring, for a moment, to FIG. 4, there is a frontal view of cam 49 as well as shutter lift rod 39 and shutter 37. Also shown in this view is spring 81 which tends to hold shutter 37 closed except when cam 49's larger diameter portions are holding shutter lift rod 39 in the open position. As can be seen, cam 49 is specifically designed to open shutter 37, hold it in that open position for a length of time and then in a step-wise function, allow shutter 37 to close and to remain closed for a time before being re-opened.

Figure 2:
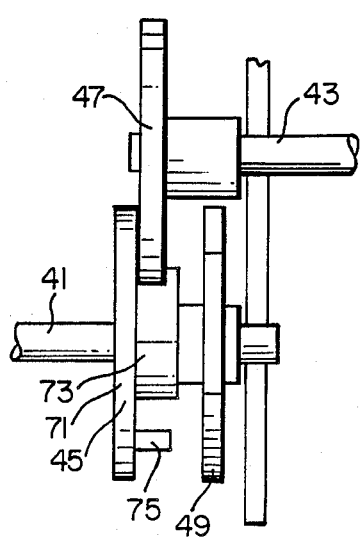
FIG. 2 illustrates a blow-up of a side view of the Geneva gear mechanism.
Figure 3:
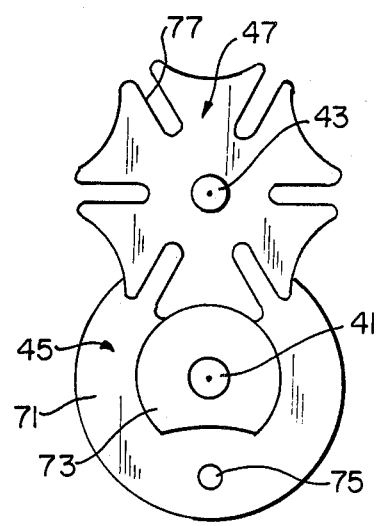
FIG. 3 shows a front view of the two Geneva gears which are utilized in FIG. 2.

Referring now to FIGS. 1, 2 and 3 collectively, it should be noted that connecting axle 41 not only drives shutter cam 49, but also drives first Geneva gear 45. First Geneva gear 45, in turn, periodically or intermittently rotates second Geneva gear 47 through an arc. Second Geneva gear 47 is connected to hub axle 43 which, at its opposite end, contains bubble wand 51. The bottom of bubble wand 51 is located in bubble liquid source tray 53 which includes a liquid fill cap neck 55 and liquid fill cap 57. In this particular embodiment, bubble liquid source tray 53 has extended sides 59. As shown in FIGS. 2 and 3, and especially in FIG. 3, first Geneva gear 45 includes a gear peg 75 as well as a cut cylinder 73 and these are located on a base plate 71. As the first Geneva gear 45 rotates with connecting axle 41, peg 75 enters into a slot second Geneva gear configuration 77 so as to move the second Geneva gear 47 about an arc. This causes the next wand head on wand 51 to move into the bubble making position which is shown in the side view in FIG. 1 and, hub axle 43, by rotating entire bubble wand 51, moves another bubble head into the bubble liquid source tray 53. In a preferred embodiment such as this, there is synchronicity between the opening and closing of shutter 37 and the stopping of bubble wand 51 by the use of the Geneva gear system described. In other words, during the time of rotation of the bubble wand 51, shutter 37 is closed and during the time that bubble wand 51 is properly positioned to make bubbles and is stationary, shutter 37 is opened and remains in the open position to maximize the efficient production of bubbles.

FIG. 4 shows a cut end view of the present invention bubble blowing machine 1 shown in FIG. 1 when cut along line AA'. Like parts are like numbered and the features referred to above in conjunction with FIG. 1 are more readily recognized by viewing FIG. 1 in conjunction with FIG. 4.

Figure 5:
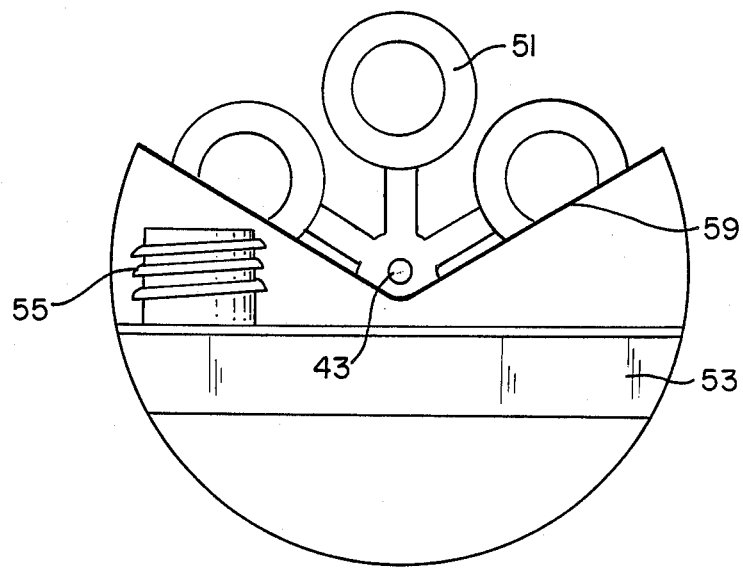
FIG. 5 illustrates a portional rear view of the wand, reservoir and fill cap of the present invention; and, FIG. 6 represents a present invention device as shown as an integral part of a three wheeler tricycle.

FIG. 5 shows a fish-eye cutout section of bubble liquid source tray 53 and shows the extent of the extended sides 59 of tray 53 to minimize spillage from sloshing and to again, more efficiently, enhance the production of bubbles with the optimally efficient use of the bubble solution, the air, etc. Liquid fill cap neck 55, hub axle 43 and bubble wand 51 are also shown in FIG. 5.

Figure 6:
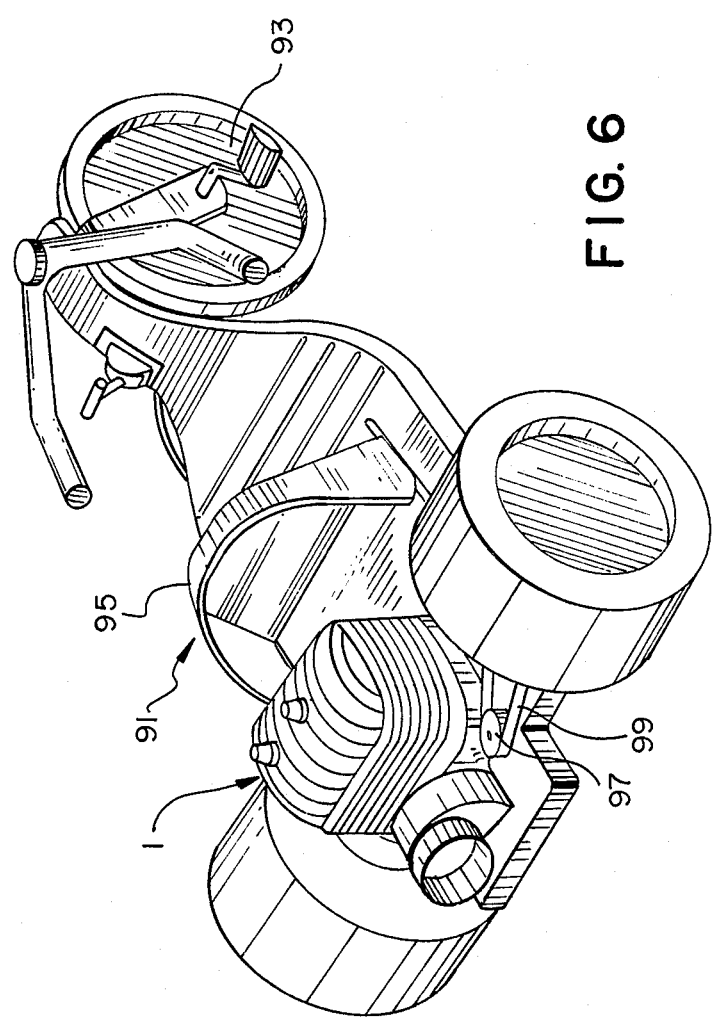

FIG. 6 shows a big wheeler toy tricycle 91 which includes pedal operated front wheel 93, operator's seat 95 and a present invention bubble blowing machine 1. In this embodiment, pulley wheel 97 is connected to bubble blowing machine 1 and acts as the motive power source. Pulley wheel 97 is motively connected by belt 99 from the bubble machine to the rear wheel of tricycle 91. Thus, when a child rides tricycle 91, bubble making machine 1 is inherently engaged and the extent of the rapidity of noise and the rapidity and, perhaps the size of the bubbles, will be dependent upon the speed at which the operator rides tricycle 91.

Obviously, numerous modifications and variations of the present invention are possible in light of the above teachings. It is therefore understood that within the scope of the appended claims, the invention may be practiced otherwise than as specifically described herein.

What is claimed is:

1. A toy bubble blowing machine having a housing which forms at least part of a toy, which comprises:
   (a) a drive axle;
   (b) a motive power source connected to and capable of driving said drive axle;
   (c) a bubble wand having a plurality of wand heads with bubble forming orifices and having a central hub, said wand heads being arranged symmetrically and concentrically about said hub;
   (d) a hub axle extending from said hub;
   (e) a Geneva gear mechanism, having a first gear which is continuously rotatable, and a second gear which is a step gear and is rotatable through an arc intermittently, said first gear and second gear being interconnected and said first gear being driven by said drive axle and said second gear being located on said hub axle so as to permit said motive power source to drive said bubble wand intermittently and to sequentially rotate each of said wand heads through a bubble liquid source position and through a bubble blowing position;
   (f) a bubble liquid source located below said hub to permit rotation of said wand heads through it;

(g) an impeller capable of blowing adequate air through one of said wand heads to create bubbles, said impeller being drivably connected to and driven by said motive power source;

(h) a shutter device having a first position to block said air movement created by said impeller from impinging on said wand beads while said wand is in motion, and a second position to permit said air movement to impinge upon said wand head to make bubbles while said wand is not in motion.

2. The toy bubble blowing machine of claim 1 wherein said motive power source is a battery driven motor and battery.

3. The toy bubble blowing machine of claim 1 wherein said housing forms a toy simulated motor.

4. The toy bubble blowing machine of claim 3 wherein said simulated motor is mounted on a riding toy.

5. The toy bubble blowing machine of claim 1 which further comprises a bubble expulsion shaft through which bubbles move after being formed and have left a wand head.

6. The toy bubble blowing machine of claim 5 wherein said shaft is an elongated circular shaft of increasing diameter.

7. The toy bubble blowing machine of claim 3 wherein said simulated motor has an expanding diameter bubble expulsion shaft through which bubbles move after being formed and have left a wand head.

8. The toy bubble blowing machine of claim 1 wherein said shutter device is driven by said motive power source in synchronicity with said Geneva gear mechanism.

9. The toy bubble blowing machine of claim 8 wherein said motive power source is connected to said shutter device via a drop off cam.

10. The toy bubble blowing machine of claim 9 wherein said drop off cam contains a non-uniform rise to create a fast opening, hold, fast closing, hold cycle of movement fo holding said shutter device in said first position and said second position for predetermined periods of time.

11. The toy bubble blowing machine of claim 1 wherein said toy bubble blowing machine is mounted on a riding toy and the motion of said riding toy is the motive power source for said toy bubble blowing machine.

12. The toy bubble blowing machine of claim 11 wherein said housing forms a toy simulated motor.

13. The toy bubble blowing machine of claim 12 wherein said simulated motor has an expanding diameter bubble expulsion shaft through which bubbles move after being formed and have left a wand head.

14. The toy bubble blowing machine of claim 11 wherein said shutter device is driven by said motive power source in synchronicity with said Geneva gear mechanism.

15. The toy bubble blowing machine of claim 14 wherein said motive power source is connected to said shutter device via a drop off cam.

16. The toy bubble blowing machine of claim 15 wherein said drop off cam contained a non-uniform rise to create a fast opening, hold, fast closing, hold cycle of movement for holding said shutter device in said first position and said second position for predetermined periods of time.

17. The toy bubble blowing machine of claim 1 wherein a noisemaker is connected to said motive power source of said machine so as to create a simulated motor sound during operation of said machine.

18. The toy bubble blowing machine of claim 2 wherein a noisemaker is connected to said motive power source of said machine so as to create a simulated motor sound during operation of said machine.

19. The toy bubble blowing machine of claim 5 wherein a noisemaker is connected to said motive power source of said machine so as to create a simulated motor sound during operation of said machine.

20. The toy bubble blowing machine of claim 11 wherein a noisemaker is connected to said motive power source of said machine so as to create a simulated motor sound during operation of said machine.

21. The toy bubble blowing machine of claim 1 wherein said motive power source and drive axle have a variable speed capability.

22. The toy bubble blowing machine of claim 2 wherein said motive power source and drive axle have a variable speed capacity.

23. The toy bubble blowing machine of claim 21 wherein said variable speed capability is a controller connected to said motive power source.

24. The toy bubble blowing machine of claim 5 wherein said motive power source and drive axle have a variable speed capacity.

25. The toy bubble blowing machine of claim 11 wherein said motive power source and drive axle have a variable speed capacity.

26. The toy bubble blowing machine of claim 25 wherein said variable speed capability is a direct result of the variable speed inherent in the operation of said riding toy.

* * * * *